UNITED STATES PATENT OFFICE.

LEON PAUL MARCHLEWSKI, OF MANCHESTER, EDGAR SIDDONS WILSON, OF STROOD, AND EBENEZER STEWART, OF LONDON, ENGLAND.

PROCESS OF MAKING DYES.

SPECIFICATION forming part of Letters Patent No. 633,245, dated September 19, 1899.

Application filed December 21, 1897. Serial No. 662,932. (No specimens.)

*To all whom it may concern:*

Be it known that we, LEON PAUL MARCHLEWSKI, a native of Russian Poland, residing at Manchester, EDGAR SIDDONS WILSON, a subject of the Queen of Great Britain, residing at Strood, and EBENEZER STEWART, a subject of the Queen of Great Britain, residing at London, England, have invented new and useful Improvements in the Production of Dyes, (for which we have obtained a patent in Great Britain, No. 21,498, bearing date September 29, 1896,) of which the following is a specification.

When crude cotton-seed oil is refined by means of weak alkaline solutions, the solutions after separation from the oil contain, among other matters, a substance which, after a series of crystallizations from glacial acetic acid and from alcohol, can be obtained as yellow crystals, easily soluble in alcohol, ether, and boiling acetic acid, not soluble in water and easily soluble in alkalies. The said substance may be isolated from other matters contained in the aforesaid solutions by treatment which consists, essentially, in submitting the solutions to fractional precipitation with earthy salts like calcium chloride, ($CaCl_2$,) which convert the fatty acids contained in the said solutions into insoluble or not easily soluble soaps. The residual liquor is then treated with an acid, such as hydrochloric acid, which will decompose alkaline carbonates and the like as well as the alkaline compound of the coloring-matter. This color-precipitate may be treated to give useful coloring-matter, as follows:

First. Take twenty parts of the color-precipitate and dissolve it in a solution of about fifteen parts of NaOH in three hundred parts of water and pass through this a current of air for several hours. The original brown solution gradually becomes brown violet and at the same time a coloring-matter is produced which possesses marked affinity for mordanted fibers. From time to time samples of the solution are drawn and used for dyeing small weighed specimens of mordanted wool or cotton, and as soon as it is found that the maximum of coloring-matter is produced the air current must be stopped and the alkaline solution acidified, thereby precipitating the coloring-matter, which may then be employed for dyeing in the usual manner. Instead of NaOH the corresponding quantity of KOH or alkaline carbonates may be used, and instead of passing a current of air through the alkaline solution the said alkaline solution may be agitated by agitators in the presence of air.

Second. Ten parts of the color-precipitate are heated with from fifty to one hundred parts of crystallized sodium sulfid, with the addition of or without sulfur. The heat is maintained for a short time at about 120° centigrade and is then raised to about 250° centigrade for several hours. There is produced a coloring-matter which dyes unmordanted cotton shades of brown. It may be used direct in the crude state for dyeing or it may be precipitated from its solution in sodium sulfid with acids and afterward redissolved in sodium sulfid. The shades can be fixed by passing the dyed goods through solutions of metallic salts—such as copper sulfate, bichromate of potassium, and the like.

Instead of flocculent precipitate the product described under the first head or an oxidation product of the latter may be used or the calcium soap obtained during the above-mentioned process for obtaining the color-precipitate and which contains a quantity of the coloring-matter of the cotton-seed oil.

The coloring-matter can be used also for printing cotton.

We claim—

The method of converting the flocculent precipitate of cotton-seed oil into a dye, consisting in oxidizing the same with air in the presence of free alkali; substantially as described.

LEON PAUL MARCHLEWSKI.
EDGAR SIDDONS WILSON.
EBENEZER STEWART.

Witnesses to the signature of Leon Paul Marchlewski:
HORATIO NELSON WARD,
JAN BIELECKI.

Witnesses to the signatures of Edgar Siddons Wilson and Ebenezer Stewart:
HENRY CUTHBERT STRIDE,
SYDNEY GEORGE ANTHONY.